March 11, 1924.
C. L. NORDEN
1,486,261
GYROSCOPIC AND OTHER ROTOR
Filed Nov. 24, 1916  2 Sheets-Sheet 1
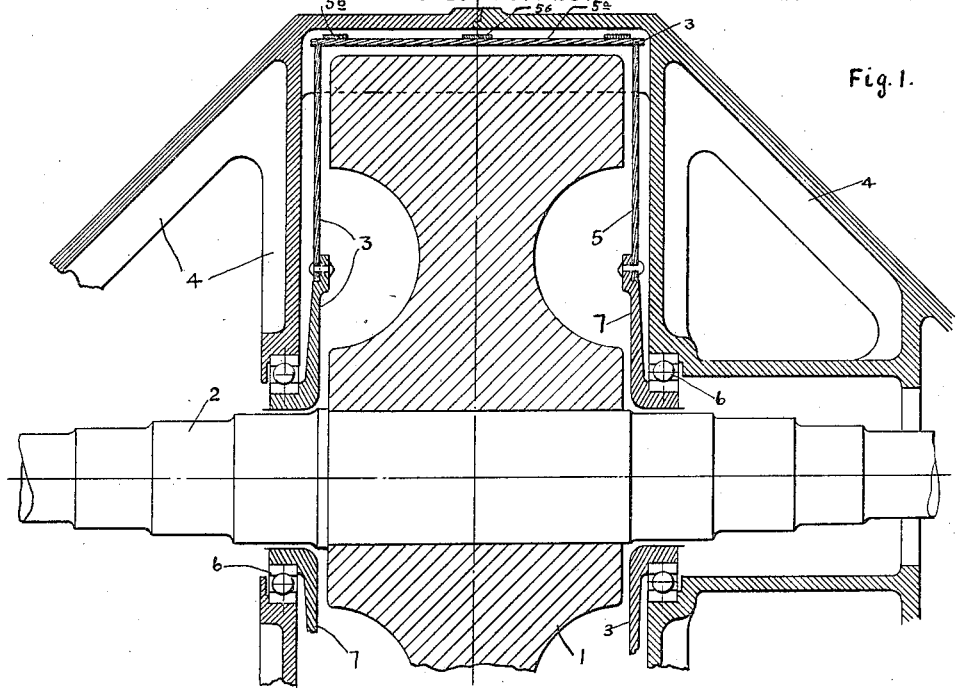
Fig. 1.
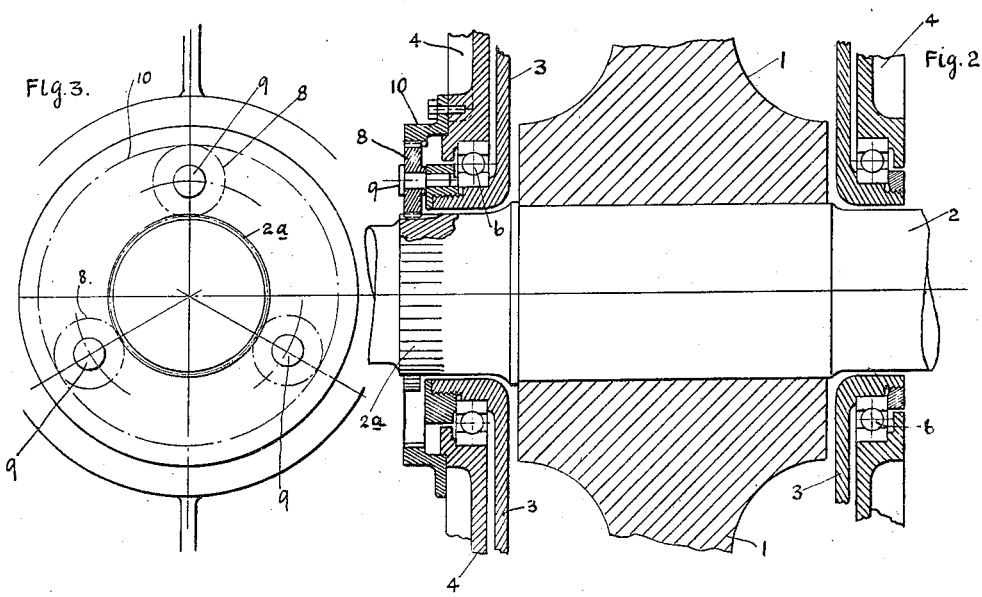
Fig. 2.
Fig. 3.
INVENTOR
Carl L. Norden,
BY
Kenyon & Kenyon
his ATTORNEYS March 11, 1924.    1,486,261
C. L. NORDEN
GYROSCOPIC AND OTHER ROTOR
Filed Nov. 24, 1916    2 Sheets-Sheet 2

INVENTOR
Carl L. Norden,
BY
Kenyon & Kenyon,
his ATTORNEYS

Patented Mar. 11, 1924.

1,486,261

UNITED STATES PATENT OFFICE.

CARL L. NORDEN, OF BROOKLYN, NEW YORK.

GYROSCOPIC AND OTHER ROTORS.

Application filed November 24, 1916. Serial No. 133,113.

*To all whom it may concern:*

Be it known that I, CARL L. NORDEN, a subject of the Queen of Holland, and a resident of the borough of Brooklyn, county of Kings, city and State of New York, have invented certain new and useful Improvements in Gyroscopic and Other Rotors, of which the following is a specification.

My invention relates to an improvement in gyroscopic and other rotors. The object is to improve gyroscopic and other rotors, to obtain more effective control over them by varying the fluid friction on such rotors, either by reducing the same and thereby reducing windage losses, or by increasing the same for braking purposes. My invention consists in the improved process and apparatus and the novel combinations hereinafter set forth.

My invention is adapted for use with bodies or rotors revolving at high velocity within a fluid, either gaseous or liquid, as, for example, a gyroscopic rotor, revolving at high velocity for gyroscopic effect, or a fly-wheel forming part of an electric power transmission for the purpose of storing mechanical energy and revolving in air, or the rotative element of hydraulic apparatus, such, for instance, as that of a pump, or a turbine, or a hydraulic friction brake, or any other rotor revolving rapidly in a fluid. By means of my improvement, fluid friction upon such a rotor is varied,—either reduced to lessen the power losses due to the fluid friction caused by the rapid rotation of such rotor in the fluid, or increased to provide a safe and efficient means for braking such rotor or quickly decreasing its mechanical energy.

My invention is particularly applicable to gyroscopic rotors, although not confined to them.

At present, gyroscopic rotors are run in close-fitting casings, in order to cut down ventilation losses, as the rotor surface, even when smooth, tends to accelerate the layers of air nearest to it and to displace them tangentially, thereby tending to cause strong fluid currents and losses due to ventilation. A well designed casing will nearly eliminate such ventilation losses, but there still remain the energy losses due to fluid friction proper. These are proportional to the density or specific weight of the fluid, the external dimensions of the rotor, and to its velocity, and these fluid friction losses are serious in the case of gyroscopic rotors, on account of their extremely high velocity and size. In order to overcome or reduce such losses, such rotors have been run in partial vacuum, but this is open to very serious objections. It involves the use of vacuum glands, which are troublesome, consume considerable power, and are expensive, especially when used on large rotor shafts running at high speed; or the entire rotating system, including electric motor, bearings, and artificial cooling apparatus, must be encased. The latter method involves the use of manholes; it renders the interior parts inaccessible and extremely difficult to supervise, and necessitates very substantial and heavy casings. It also involves the use of an air pump and governor to create and maintain a partial vacuum, which elements use power and introduce complications. Moreover, where a gyroscopic rotor is driven by an electric motor and the vacuum method is employed, it is practically impossible to obtain a high enough vacuum with the required air cooling necessary for the electric motor. Again, the vacuum casing must be very strong to resist the atmospheric pressure, and it is very difficult to keep the casing tight for any length of time.

None of these difficulties are present in my improved apparatus. By means of my invention, fluid friction losses can be eliminated to a large extent without incurring the drawbacks incident to the vacuum method. The surrounding casing which I employ to vary the fluid friction on the rotor is very light, and is subject to none but its own centrifugal stresses and to small gyroscopic effects (which effects are useful). All parts of the apparatus are easily accessible. The windage power losses are reduced to the best figures obtainable under practical conditions by the vacuum method, and the gyroscopic effects obtained from the same weight of apparatus are very much increased.

Again, the braking of high speed rotors is a difficult and dangerous operation. Electric braking is slow and insufficient. Hydraulic friction brakes have been employed, but they involve extra weight, increased cost, and considerable complication. My improvement affords quick, efficient, safe, and inexpensive means for braking such rotors.

In the drawings which form part of this specification, I have shown, and will now proceed to describe, my invention as applied to a gyroscopic rotor in its preferred form, although my invention is not limited to such rotors or to the particular embodiment of the gyroscopic rotor herein shown and described.

Referring now to this specific embodiment of my invention shown in the drawings, Figure 1 is a central vertical section through a part of a gyroscopic rotor embodying my invention, showing a form of my invention in which the casing is mounted and is free to rotate independently of the rotor;

Figure 2 is a similar view through a modification, in which the casing and the rotor are geared together;

Figure 3 is an end view of the part shown in Figure 2;

Figure 4:
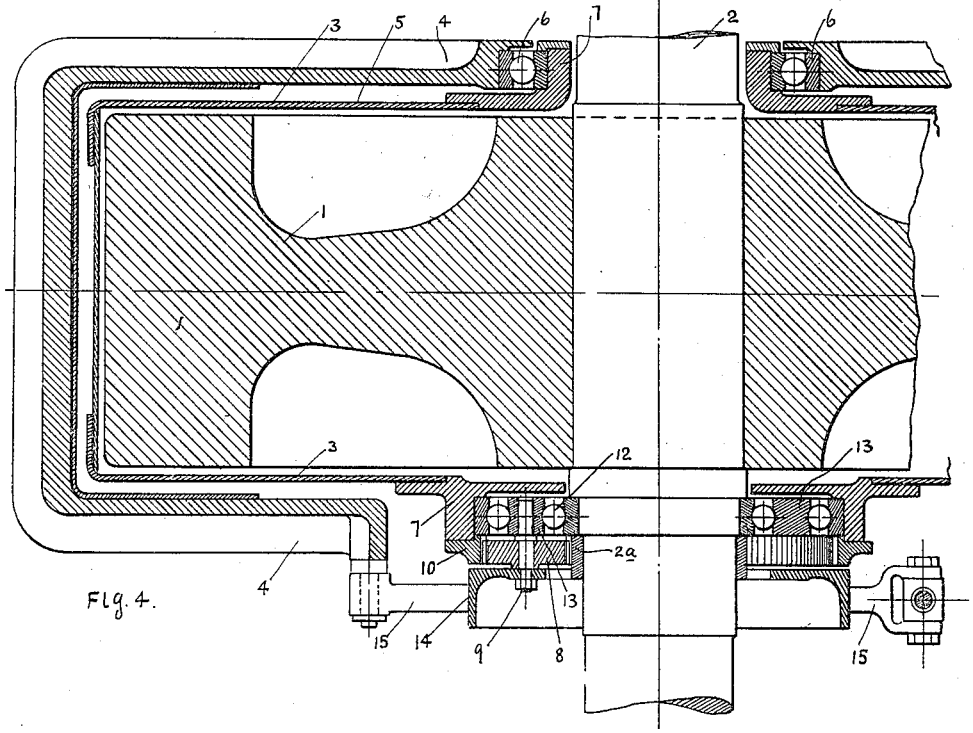
Figure 4 is a vertical section through a rotor, showing the casing and the rotor shaft geared to each other, with means for reversing the direction of rotation of the casing.

Referring now particularly to the apparatus shown in Figure 1, 1 is the rotor, fixed on shaft 2. Only a part of this shaft is shown. The remainder and other parts of the apparatus, being of well-known construction, are omitted for sake of clearness. 4 is a fixed frame or structure, carrying the bearings for the rotor shaft and other parts of the apparatus. This frame is mounted in bearings secured to the vessel to be stabilized. 3 is a casing surrounding the rotor 1 and mounted concentrically with it on ball bearings 6, 6. This casing, as shown, consists of a light cylindrical drum composed of side pieces 5, 5, and a cylindrical end piece 5ª, securely fastened together, and hubs 7. 5ᵇ are bands surrounding the drum to strengthen and hold it together. The side plates are secured to the cylindrical hubs 7, which are the parts of the casing which turn on ball bearings 6. Casing 3 is mounted concentrically with rotor 1, but is free to rotate independently of it.

In operation, the rapid rotation of rotor 1 causes a negative friction torque to be exerted upon the rotor by the air filling the space between the rotor and the casing, which causes a power loss due to the fluid friction of the air. A substantially equal torque is exerted by this air layer on the casing, tending to rotate it in the same direction as the rotor. As the casing is allowed to rotate, this torque will be proportional to the relative velocity between the surfaces of the rotor and the inner surface of the casing, or, in other words, to the relative speed of these two elements. The casing will tend to increase its rotation to a speed at which the positive torque it receives from the rotor through the air layer between them equals the negative torque exerted upon it through external fluid friction and through bearing friction. It will then maintain this equilibrium velocity. The rotation of the casing 3 very materially reduces the fluid friction upon the rotor and very materially decreases the windage losses due to fluid friction which would otherwise occur were the rotating casing not present and were the rotor instead revolving inside of a stationary casing. The saving in this windage loss is capable of substantially mathematical computation. For my present purpose, it is sufficient to say that the saving in horsepower due to the reduction in fluid friction on the rotor is very material. For example, I have found that, by the use of my improvement, a saving of sixty per cent would be realized in the case of a gyroscopic rotor revolving with a peripheral speed of thirty thousand feet per minute. In other words, if the losses from fluid friction exerted upon the rotor under these conditions with a stationary casing were considered as one hundred per cent, the losses under the same conditions with my rotatable casing in place of the stationary casing would be only forty per cent.

It will be noted that the rotation of the casing in Figure 1 has varied the fluid friction on the rotor by materially decreasing it, effecting large saving in energy, which would otherwise be lost. It will also be noted that the casing in Figure 1 is mounted independently of the shaft, and is free to rotate at any speed established by the laws of equilibrium.

In Figures 2 and 3, I have shown my improved device with the casing geared to the rotor shaft. In this case, there are connections between the rotor shaft and the casing, causing the rotor and the casing to rotate at any desired ratio of speed. Here shaft 2 carries teeth 2ª, which engage small pinions 8, each revolving on a pin 9, fixed to casing 3. The pinions also engage a rack 10, fixed to frame 4. This is a planetary gear drive, the casing 3 being rotated from shaft 2 through pinions 8. The speed at which casing 3 will be rotated will depend, of course, upon the ratio of the gears. As here shown, the speed would be less than one-half of the speed of shaft 2. The effect of this coupling is to return valuable casing torque to the rotor, the coupling being such that the casing is compelled to rotate at a speed materially less than that which it would attain when not coupled.

In that case, the coupling transmits to the rotor casing torque which would either have to be destroyed by braking or would further accelerate the casing, if the latter were free. It is thus possible to obtain a comparatively large reduction in fluid friction with conservative or low casing speeds.

Referring to the same example of a rotor revolving with a peripheral speed of thirty thousand feet per minute and employing a geared casing running at one-fifth of the speed of the rotor, the saving in energy would be forty-eight per cent, as against thirty-four per cent for the free casing running at the same speed, or a saving over the latter case of thirty-five per cent.

Figure 5:
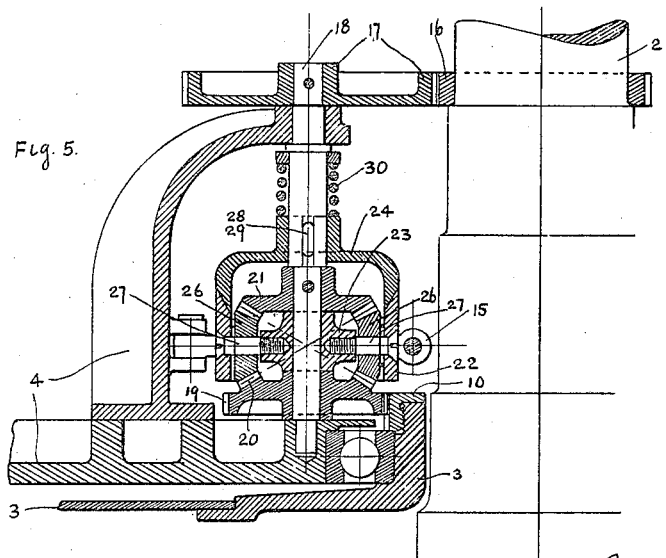
Figure 5 is a detail section through a differential gearing connection between the casing and the rotor shaft for permitting the casing to rotate in either direction.

In Figures 4 and 5, I have shown my improved device with means for changing the speed of rotation of the casing relative to that of the rotor, and particularly for decreasing the speed of the casing and for reversing its direction of rotation relative to that of the rotor, for the purposes of braking the rotor.

In Figure 4, the casing 3 runs on ball bearings 6 at its upper end and on the outer set of double ball bearings 12 on shaft 1. The friction of the double ball bearings is about equal, the moment of one about overcoming that of the other. Pins 9, carrying gears 8, are secured in the intermediate raceway 13, in contact with both ball bearings 12, 12. Rack 10 is, in this case, bolted to hub 7 of casing 3. Pins 9 carry a brake flange 14, with which brake bars 15, secured to framework 4, are adapted to cooperate. Pinions 8 mesh with gear 2ᵃ on shaft 1 and with rack 10.

In the ordinary operation of the apparatus of Figure 4, the rotation of shaft 1 through gear 2ᵃ carries pinions 8, pins 9 and raceway 13 and casing 3 in the same direction until an equilibrium of speed of rotation of these parts is obtained, as above described. The operation, so far, is exactly like that of the apparatus of Figure 1. If it is desired to reduce the speed of the rotor, or to brake it, brake bars 15 are pressed against brake flange 14. This will slow down the brake flange, pins 9 and raceway 13, and cause an increased rotation of pinions 8. This will reduce the speed of rotation of casing 3, and will bring it to a stop and rotate it in the opposite direction. The fluid friction torque exerted on the rotor by this slower rotation of casing 3, and especially by its rotation in the reverse direction, will exert a powerful fluid friction upon rotor 1, and form an effective fluid brake.

In Figure 5, I have shown a somewhat different arrangement of parts for accomplishing this same purpose. Here shaft 2 carries a gear 16, meshing with gear 17, fast on shaft 18. Gear 19 is loose on shaft 18. This gear carries beveled gear 20. A similar beveled gear 21 is fast to shaft 18. Beveled pinions 26, 26, bear inner sleeve 23, and outer brake ring 22 can freely rotate on shaft 18, pinions 26 being loose on cross shaft 27. 24 is a clutch cone compelled to rotate with shaft 18, but free to slide coaxially on it by means of key and slot 28, 29. Cone 24 is lightly pressed by spring 30 into the conical seat of brake ring 22. Ordinarily, casing 3 is geared to shaft 1 through gears 16, 17, shaft 18, beveled gears 20, 19, and rack 10 on casing 3, so that casing 3 rotates in the same direction with the rotor shaft. As soon as a braking moment is applied to ring 22, the clutch cone will slip and pinions 26 will revolve. The direction of rotation of the casing may be completely reversed.

In the drawings, I have shown the rotor and the casing so connected that the rotor and the casing rotate at any desired ratio of speed by means of gears. It will be understood that the connections between the rotor and the casing are not limited to these, but may be any suitable connections, whether hydraulic, or electric, or other suitable connections, and that the ratio of such connections or coupling may be varied in any suitable manner.

In the drawings, I have shown only one rotatable casing, but my invention is not limited to the use of one casing. A plurality of rotatable casings could be employed, all of them mounted concentrically with the rotor. A greater saving in windage can be effected by a plurality of such casings than by a single casing. Thus, very large rotors, running at a very high peripheral velocity, should be provided with several concentric casings, and, by means of these, the total windage loss can be reduced to less than one-fifth of what it would be with a rotor revolving within a single fixed casing.

Many other changes and modifications than those herein specifically recited can be made from the apparatus shown in the drawings without departing from my invention.

What I claim as new and desire to secure by Letters Patent is:—

1. The combination of a rotor, a surrounding casing concentrically mounted with the rotor, connections between the rotor and the casing adapted to control the ratio of speed and the direction of rotation between them, whereby the fluid friction of the rotor may be controlled.

2. The combination of a rotor, a surrounding casing concentrically mounted with the rotor, connections between the rotor and the casing to cause the latter to rotate with the former, and means for reversing the direction of rotation of the casing, whereby the fluid friction upon the rotor may be varied by the rotation of the casing.

3. The combination of a rotor, a surrounding casing concentrically mounted with the rotor, connections between the rotor and the casing to cause the latter to rotate with the former, and means for braking the casing, whereby a braking fluid torque will be applied to the rotor.

4. The combination of a rotor, a rotatable surrounding casing so mounted and arranged with reference to the rotor that the rotation of the casing will vary the fluid friction upon the rotor, and means for braking the casing and thereby increasing the fluid friction of the rotor for braking purposes.

5. The combination of a rotor, a casing adapted to revolve coaxially with the rotor, and means to couple the casing, the rotor and a non-rotating frame at a definite ratio, causing the casing to rotate in any desired direction relative to the direction of rotation of the rotor to vary the energy losses caused by fluid friction.

6. The combination of a gyroscopic rotor mounted on bearings in a frame, capable of tilting or precessing, a casing also mounted in said frame and adapted to rotate concentric with the rotor in either direction, and means to couple both rotor and casing to said frame at a definite ratio to decrease fluid friction losses and increase the gyroscopic effect or to increase fluid friction losses and decrease the gyroscopic effect of the gyroscopic apparatus.

7. The combination of a gyroscopic rotor fixed upon a shaft, a casing adapted to revolve on the rotor shaft coaxially with the rotor and precessing with the rotor, means to secure a definite ratio of rotation between rotor and casing, to decrease the fluid friction energy losses of the rotor, and means for braking the casing and thereby increasing the fluid friction of the rotor for braking purposes.

8. The combination of a rotor, a casing, adapted to revolve coaxially with the rotor, and means to couple the casing and the rotor at a definite ratio, causing the casing to rotate in any desired direction relative to the direction of rotation of the rotor to vary the energy losses caused by fluid friction.

9. The combination of a gyroscopic rotor mounted on bearings in a frame, capable of tilting or precessing, a casing also mounted in said frame and adapted to rotate concentric with the rotor in either direction, and means to couple both rotor and casing at a definite ratio to decrease fluid friction losses and increase the gyroscopic effect or to increase fluid friction losses and decrease the gyroscopic effect of the gyroscopic apparatus.

In testimony whereof, I have signed my name to this specification.

CARL L. NORDEN.